United States Patent [19]

Marechal

[11] Patent Number: 5,499,783
[45] Date of Patent: Mar. 19, 1996

[54] UNDERFRAME FOR A PASSENGER AIRCRAFT SEAT, THE UNDERFRAME INCLUDING AN ATTACHED ENERGY-ABSORPTION DEVICE

[75] Inventor: Robert R. Marechal, Paris, France

[73] Assignee: Societe Industrielle et Commericale de Materiel Aeronautique, Issoudun, France

[21] Appl. No.: 237,395

[22] Filed: May 3, 1994

[30] Foreign Application Priority Data

May 14, 1993 [FR] France .................................. 93 05865

[51] Int. Cl.$^6$ ................................................. B64D 25/04
[52] U.S. Cl. .................. 244/122 R; 188/374; 297/216.2
[58] Field of Search ..................... 244/122 R; 297/216.1, 297/216.19, 216.2; 188/371, 374

[56] References Cited

U.S. PATENT DOCUMENTS

| | | | |
|---|---|---|---|
| 2,959,207 | 11/1960 | Brewster | 297/216.2 |
| 3,059,966 | 10/1962 | Spielman . | |
| 3,603,638 | 9/1971 | McGregor | 297/216.2 |
| 4,375,300 | 3/1983 | Long et al. | 244/122 R |
| 4,911,381 | 3/1990 | Cannon et al. | 244/122 R |
| 5,224,755 | 7/1993 | Beroth | 297/216.1 |

FOREIGN PATENT DOCUMENTS

| | | | |
|---|---|---|---|
| 2250431 | 6/1992 | United Kingdom | 244/122 R |
| WO91/17085 | 11/1991 | WIPO . | |

*Primary Examiner*—William Grant
*Attorney, Agent, or Firm*—Young & Thompson

[57] ABSTRACT

An underframe for a passenger aircraft seat, the underframe including at least one element forming a front leg and at least one element forming a rear leg, and energy absorption structure that is active when a moving element of the seat moves relative to another element of the seat or of the floor of the aircraft cabin, under the effect of the seat being subjected to deceleration above a predetermined value. The energy absorption structure includes an energy absorption device including a male part that penetrates by force and with plastic deformation into an aperture in a female part. Either the female part or the male part is attached on and directly associated with the moving element, and the other part, i.e. the male part or the female part, is attached on and directly associated with the other element.

10 Claims, 2 Drawing Sheets

UNDERFRAME FOR A PASSENGER AIRCRAFT SEAT, THE UNDERFRAME INCLUDING AN ATTACHED ENERGY-ABSORPTION DEVICE

The invention relates to an underframe for a passenger aircraft seat, the underframe including an attached energy-absorption device.

BACKGROUND OF THE INVENTION

When a structural element is subjected to a large amount of acceleration or of deceleration relative to the structure that carries it, and if said structural element is rigidly attached to its carrying structure, it tends to be torn off therefrom under loading from its own inertia. If said element is deformable, a portion of the energy due to the inertial load of the structural element is transformed into kinetic energy which can be absorbed by an absorber element.

In some cases, it can be necessary to limit the displacement of the structural element relative to the supporting structure. Otherwise, surrounding elements or elements supported by the structural element may be damaged.

In such cases, it is therefore essential to obtain the best possible ratio between energy absorption and displacement limitation.

This is a constant concern of the manufacturers of seats for passenger aircraft. In the event that the aircraft crashes, or that a large amount of acceleration or of deceleration is suddenly caused for any other reason, the potential energy of the inertial load of the seat and of its occupant must be attenuated by displacing the structures of the seat and by absorbing the resulting kinetic energy so as to prevent the seat and its occupant from being torn off from the floor of the cabin. However, such displacements must be limited so that occupant does not plough into the seat which is situated in front of said occupant. Current safety standards impose maximum displacements in various directions on several elements (e.g. the seatback, or the seat proper).

The systems currently used for obtaining the best ratio of energy absorption to displacement rely on hinged or deformable structures in which an energy absorption device provides rigidity in the normal operating position, and absorbs energy and controls displacement during a crash.

FR-A-2 612 151 describes an aircraft seat underframe provided with an energy absorption device comprising a rigid rod, one end of the rod being associated with a first element of the structure, and the other end being sharp and engaged in a block made of a plastics or equivalent synthetic material, so that the sharp end of the rod can penetrate into the block by cutting through the material of the block, once a certain value is reached for the force pressing the rod against the block. The block is associated with a second element of the structure, which element moves relative to the first element in the event of accidental sudden acceleration or deceleration. The device may operate either in traction or in compression. Such a device suffers from a certain number of drawbacks, such as its lack of compactness, and the difficulties and the high cost involved in obtaining a wide range of trip strength values and a wide range of energy absorption capacities. Furthermore, such devices have tolerances of plus or minus 10% on their strength values, and this prevents safety from being optimized with respect to tripping the device as a function of the use which is made of the underframe (weight of the seat to be supported, number of seats, position of the underframe relative to the floor of the aircraft and to the other seats, etc.).

U.S. Pat. No. 4,911,381 discloses an aircraft seat underframe provided with an energy absorption device which is equivalent to the above-described device, which suffers from the same drawbacks, and which comprises a rear leg hinged to a triangular bottom base.

OBJECTS AND SUMMARY OF THE INVENTION

An object of the invention is to mitigate those drawbacks by providing a seat underframe whose energy absorption capacity can be modified and adapted easily, quickly, and cheaply to the conditions under which the underframe is to be used. More particularly, an object of the invention is to provide such a seat underframe in which it is possible to make such a modification without modifying the relative positions, the shapes, and the dimensions of the constituent parts of the underframe itself.

Another object of the invention is to provide a seat underframe which offers the same advantages as the above-mentioned known underframes, but which is lighter, and which is particularly simple to manufacture and to install.

Another object of the invention is to provide such a seat underframe which absorbs energy on impact, with a pivot angle through which the front leg pivots being limited to a maximum predetermined value.

Another object of the invention is to provide such a seat underframe which is capable of satisfying the dynamic "16 g type" tests that are imposed by international civil aviation standards.

To these ends, the invention provides an underframe for a passenger aircraft seat, the underframe including at least one element forming a front leg and at least one element forming a rear leg, and energy absorption means that are active when a moving element of the seat moves relative to another element of the seat or of the floor of the aircraft cabin, under the effect of the seat being subjected to deceleration above a predetermined value, wherein the energy absorption means include an energy absorption device including a male part that penetrates by force and with plastic deformation into an aperture in a female part, wherein either the female part or the male part is attached on and directly associated with the moving element, and wherein the other part, i.e. the male part or the female part, is attached on and directly associated with the other element.

A main first advantage of the present invention lies in the fact that the energy absorption device is attached to the structure of the underframe and is associated therewith between two elements of that structure without any other element for linking together those two elements of the structure, or for linking one of those elements to the rest of the structure.

This means that the energy absorption device is not interposed directly in the structure of the seat underframe, but rather it is added on in parallel with any other means for directly associating the two elements with each other.

A second advantage of the invention lies in the structural simplicity of the energy absorption device, enabling such devices to be manufactured by using conventional machinery, and a wide range of devices to be obtained as a function of their trip strengths by merely varying the dimensional characteristics or the materials of the male and/or female parts.

A third advantage of the invention results from combining the first two advantages and relates to the improvement made in passenger safety with respect to the energy absorption of the seat in the event of a crash.

The invention also provides a seat underframe including a combination of all or some of the characteristics mentioned above or below.

BRIEF DESCRIPTION OF THE DRAWINGS

Other advantages appear from the following description given with reference to the accompanying drawings, in which.

MORE DETAILED DESCRIPTION

Figure 2:
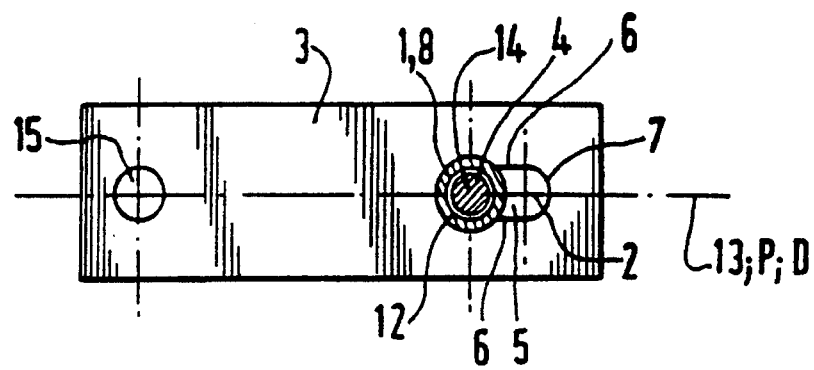
FIG. 2 is a diagrammatic view of the FIG. 1 device on line II—II.

The passenger aircraft seat underframe of the invention comprises at least one element 30 forming a front leg, and at least one element 31 forming a rear leg. The underframe further comprises energy absorption means. When a moving element 10 of the seat moves relative to another element 20 of the seat or of the floor of the aircraft cabin, an energy absorption device 40, which is part of the energy absorption means and which comprises a male part 1 penetrating by force and with plastic deformation into an aperture 2 provided in a female part 3, absorbs some or all of the energy relating to the displacement by means of said deformation. The movement of element 10 relative to element 20 may be generated by the action of a force exerted on the moving element 10 relative to the other element 20 under the effect of any deceleration to which the seat is subjected above a predetermined value. In accordance with the invention, either the male part 1 or the female part 3 is attached on and directly associated with the moving element 10, independently of any other means for linking the element 10 to the rest of the seat or to the floor, and the other part (i.e. the female part 3 or the male part 1) is attached on and directly associated with the other element 20 independently of any other means for linking the other element 20 to the rest of the seat or to the moving element 10.

In the embodiment shown in the figures, and in accordance with the invention, the underframe comprises a triangular base 33 defining a front anchor point 34 and a rear anchor point 35 for anchoring the seat to the floor of the cabin, and a raised intermediate vertex 36. The underframe further includes at least one leg 31 associated via its top end 37 with the structure of the seat and via its bottom end 38 with the triangular base 33. In this embodiment and in accordance with the invention, said moving element 10 is constituted by the leg 31, the other element 20 is constituted by the triangular base 33, and the energy absorption device 40 is attached and directly associated between the leg 31 and the base 33. The bottom end 38 of the leg 31 is associated with the triangular base 33 at least in the vicinity of the raised intermediate vertex 36 thereof. In this preferred but non-limiting embodiment, the leg 31 is rigidly associated with the base 33 via an energy absorption device 32 integrated in the underframe between the leg 31 and the base 33, which device is part of the energy absorption means and is designed to bend when said relative force is applied, so as to enable the leg 31 to pivot about an axis substantially intersecting the intermediate vertex 36.

In this embodiment, the energy absorption device 40 is associated with the leg 31, at least in the vicinity of the bottom end 38 thereof, independently from the bendable device 32, and is associated with the triangular base 33, at least in the vicinity of the intermediate vertex 36, independently of the rigid association of the leg 31 with the base 33.

The female part 3 of the energy absorption device 40 is provided with an aperture 2 having a flared portion 4 extended by an oblong portion 5 having two facing abutment surfaces 6 and an end 7 opposite from the flared portion 4.

Figure 1:
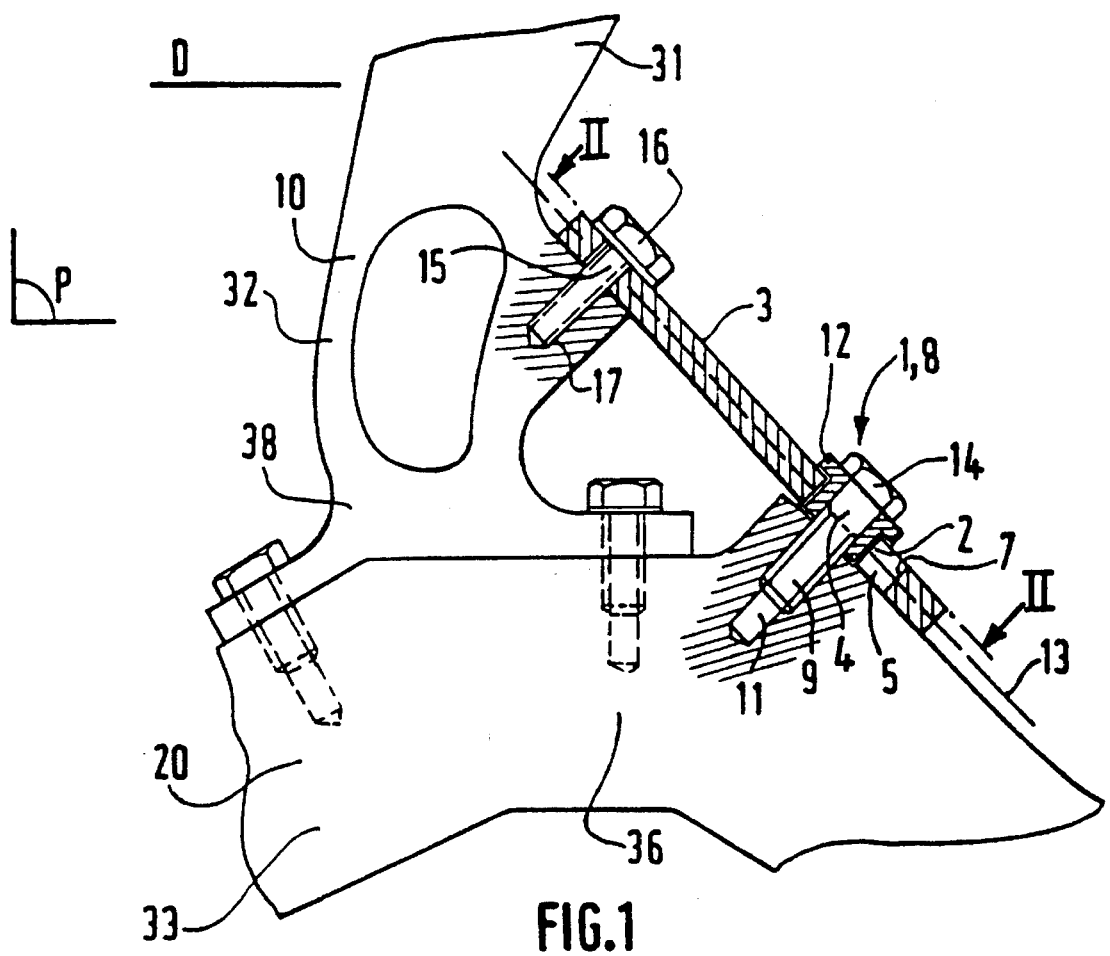
FIG. 1 is a diagrammatic section view through an energy-absorption device mounted on a seat underframe of the invention.
Figure 3:
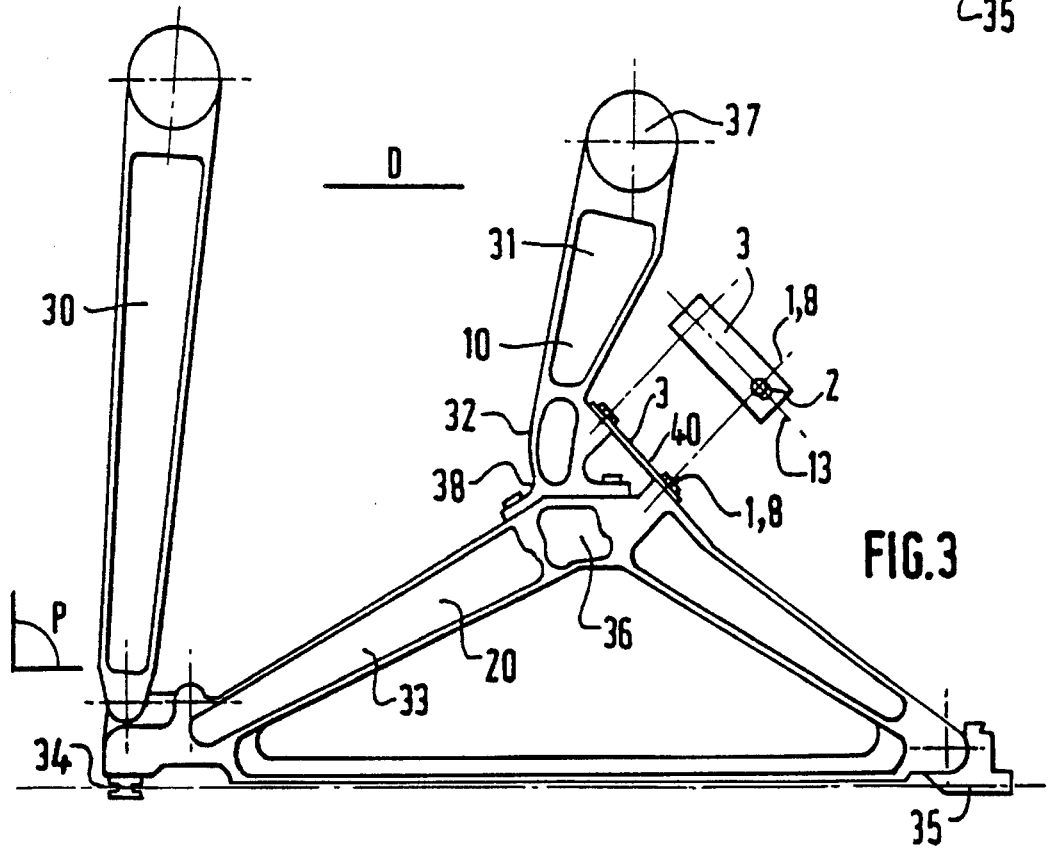
FIG. 3 is a diagrammatic view of a seat underframe of the invention in a normal use position.

In an inactive position of the energy absorption device 40 (FIGS. 1, 2, and 3), the flared portion co-operates with the male part 1 which forms a stud 8 that is significantly wider than the width between the abutment surfaces 6 of the oblong portion 5.

Figure 4:
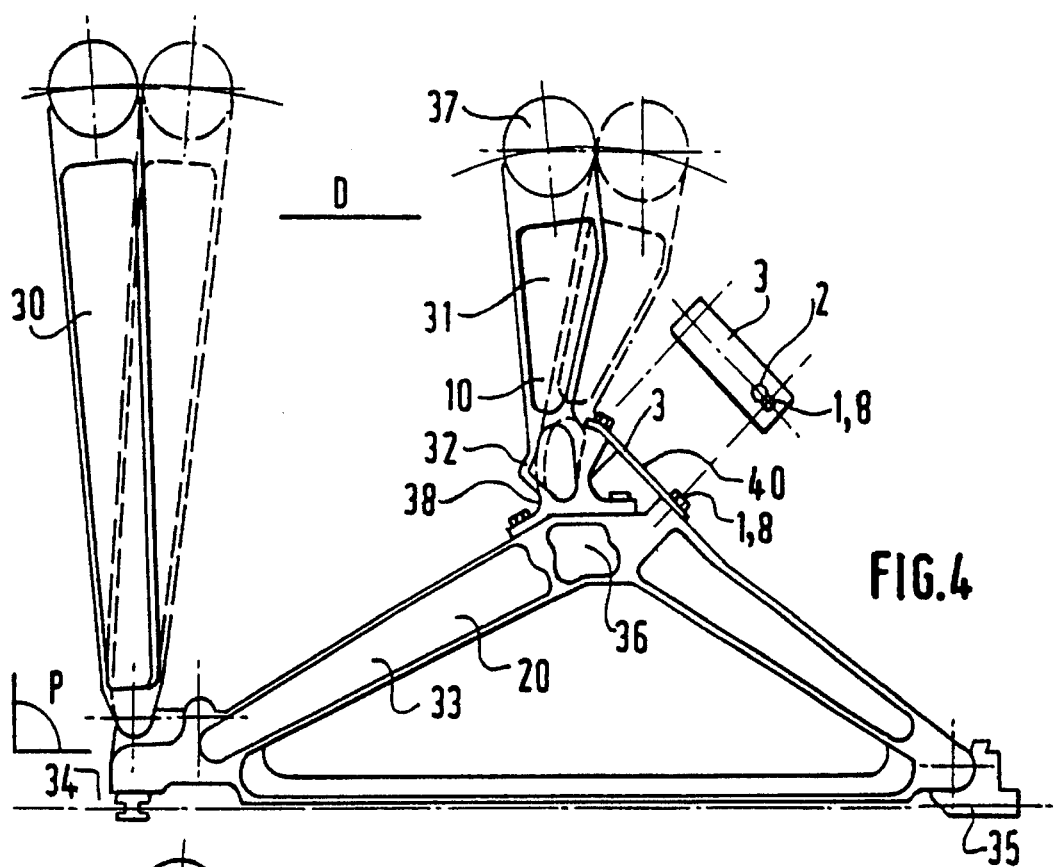
FIG. 4 is a diagrammatic view of a seat underframe of the invention during a crash.

In an active position (FIG. 4), the energy absorption device 40 absorbs some or all of the energy created by the displacement, by means of the stud of the male part 1 plastically deforming the abutment surfaces of the oblong portion 5 in the female part 3. The displacement is limited by means of the stud 8 of the male part 1 co-operating with the end 7 of the oblong portion 5, which end forms an end-of-stroke abutment for the stud 8.

In the embodiment shown in the figures, the energy absorption device 40 includes a male part 1 in the form of a stud including a threaded association portion 9 that cooperates with a tapped hole 11 in the element 20 with which it is associated.

In the embodiment shown in the figures, the energy absorption device 40 includes a female portion 3 whose oblong portion 5 has its major axis 13 lying in a plane P that also contains the direction D of the relative motion.

In this embodiment, the flared portion 4 is a circular hole 4, and the oblong portion 5 is an oblong slot 3, both of which pass through the female part 3. The male part 1 forming the stud 8 includes a ring 12 whose outside diameter is substantially equal to the diameter of the circular hole 4 through which a screw 14 passes so as to co-operate with the tapped hole 11 in the element 20 with which the male part 1 forming the stud 8 is associated. In this preferred but non-limiting embodiment, the diameter of the screw 14 is substantially equal to the width between the walls 6 of the oblong slot 5.

In this embodiment and in accordance with the invention, the female part 3 is a flat rectangular plate in which the major axis 13 of the oblong portion 5 is parallel to the long sides of the rectangle, and runs along the long midline of the rectangle. The female part is associated with the moving element 10 via an association hole 15 through which a screw 16 passes so as to co-operate with a tapped hole 17 in the moving element 10.

The value above which the energy absorption device performs its function is predetermined by the materials used to make the male and female parts, by the thickness of the female part, and by the ratio between the width of the oblong slot 5 and the diameter of the circular hole 4 or of the stud 8. Given these parameters, it is possible to establish the force required to exceed the elastic limit of the abutment surfaces 6 of the oblong slot 5, and to go into the plastic domain thereof. The limitation on the movement is defined by the length of the oblong slot 5.

Naturally, although only one embodiment of the invention and only one operating mode are described, any modification or any variant made by a person skilled in the art while retaining the same spirit remains within the ambit of the present invention. For example, the energy absorption device may operate in compression. In the same way, it may be provided with two oblong slots 5, one for each hole 4 and 15. Likewise, the energy absorption may be performed by the male portion 1 forming the stud 8 being deformed by the abutment surfaces 6 of the aperture in the female portion.

I claim:

1. An underframe for a passenger aircraft seat, the underframe including a front leg and a rear leg, and energy absorption means that are effective when a moving first element of the seat moves relative to a second element of the seat fixedly secured to the floor of the aircraft cabin, under the effect of the seat being subjected to deceleration above a predetermined value, the energy absorption means including an energy absorption device that undergoes irreversible plastic deformation, the device being located between said moving first element and said second element, said energy absorption device including a male part disposed within a female part, one of the female and male parts being attached on and directly connected to said moving first element, the other of said male and female parts being fixedly attached on and directly connected to said second element, whereby a deceleration greater than said predetermined value provokes a plastic deformation of one of said female part and said male part.

2. An underframe according to claim 1, further comprising a triangular base defining a front anchor point and a rear anchor point for anchoring the seat to the floor of an aircraft cabin, and a raised intermediate vertex located between the front anchor point and the rear anchor point; said rear leg being connected by a top end with the structure of the seat and by a bottom end of the triangular base, said rear leg comprising said moving first element, said second element being the triangular base, and the energy absorption device undergoing plastic deformation being attached on and directly connected between said rear leg and the base.

3. An underframe according to claim 2, wherein said rear leg is directly connected by said bottom end to the triangular base, at least in the vicinity of the raised intermediate vertex thereof.

4. A seat underframe according to claim 3, wherein the energy absorption device is directly connected to said rear leg at least in the vicinity of the bottom end thereof, and is directly connected to the base at least in the vicinity of the bottom end thereof, and is directly associated with the base at least in the vicinity of the raised intermediate vertex thereof, so that the energy absorption device operates in traction in the event that the deceleration to which the seat is subjected above said predetermined value tends to cause said rear leg to pivot forward relative to the base.

5. A seat underframe according to claim 1, wherein the female part has an aperture having a flared portion extended by an oblong portion having two facing abutment surfaces and an end opposite from the flared portion, and has a width between the abutment surfaces that is less than the width of the flared portion, said flared portion receiving, when the device is in the inactive position, the male part which is in the form of a stud and which is significantly wider than the width between the abutment surfaces of the oblong portion, so that, when the device is deformed, it absorbs energy by plastic deformation of the abutment surfaces of the oblong portion of the female part, which surfaces are forced apart by the stud forming the male part being inserted and moved between them.

6. A seat underframe according to claim 5, wherein the aperture is provided with an end forming an end-of-stroke abutment for the male part limiting the amplitude of the movement of said rear leg relative to the base.

7. A seat underframe according to claim 5, wherein the stud includes a threaded portion received in a tapped hole in the element to which the stud is attached.

8. A seat underframe according to claim 5, wherein the oblong portion has a long axis lying in a plane that also contains the direction of movement of the female part relative to the male part.

9. A seat underframe according to claim 5, wherein the flared portion is a circular hole and the oblong portion is an oblong slot, both of which pass through the female part.

10. A seat underframe according to claim 9, wherein the male part includes an outer ring whose outer surface spreads apart the abutment surfaces of the oblong slot when the device is plastically deformed.

* * * * *